United States Patent
Maurer

Patent Number: 5,755,095
Date of Patent: May 26, 1998

[54] SECONDARY AIR SUPPLY SYSTEM FOR INTERNAL COMBUSTION ENGINES

[76] Inventor: Paul S. Maurer, 8010 Lt. William Clark Rd., Parker, Colo. 80134

[21] Appl. No.: 645,554

[22] Filed: May 13, 1996

[51] Int. Cl.⁶ .................................................. F01N 3/10
[52] U.S. Cl. ................................................ 60/307; 123/572
[58] Field of Search ............................. 123/572; 60/307, 60/289, 304

[56] References Cited

U.S. PATENT DOCUMENTS

| | | | |
|---|---|---|---|
| 3,106,821 | 10/1963 | Ridgway | 60/30 |
| 3,314,230 | 4/1967 | Vanderpoel | 60/30 |
| 3,498,054 | 3/1970 | Theed | 60/30 |
| 3,672,172 | 6/1972 | Hammond | 60/282 |
| 3,877,222 | 4/1975 | Scherenberg | 60/307 |
| 4,085,586 | 4/1978 | Shibata | 60/277 |
| 4,096,692 | 6/1978 | Nakamura | 60/307 |
| 5,197,282 | 3/1993 | Kume | 60/307 |
| 5,338,903 | 8/1994 | Winberg | |
| 5,339,629 | 8/1994 | Winberg et al. | 60/299 |

*Primary Examiner*—Marguerite McMahon
*Attorney, Agent, or Firm*—Pittenger & Smith, P.C.

[57] ABSTRACT

An improved and easily adaptable system to provide secondary air for an internal combustion engine, including a single-cylinder engine unit having (i) a closed crankcase capable of experiencing pressure pulsations produced by the reciprocating motion of a piston in a cylinder, (ii) in the case of a four-cycle engine, a crankcase breather system including a breather assembly attached to a chamber integrally formed with the engine block, or, in the case of a two-cycle engine, an intake reed plate attached to the intake port of the engine, and (iii) an exhaust system including a catalytic converter. The secondary air supply system consists of an external secondary air pump, such as a diaphragm pump, as disclosed in U.S. Pat. No. 5,197,282, and an air pump actuator plate which fits between: (a) in the case of a four-cycle engine, the crankcase breather assembly and the engine block, enabling the crankcase breather system to remain functional; or (b) in the case of a two-cycle engine, the intake reed plate and the intake port. The actuator plate consists of a spacer with an inner opening into which either the crankcase breather assembly fits in the case of a four-cycle engine, or the reed plate fits in the case of a two-cycle engine. The actuator plate further consists of a housing defining a chamber located on one side of said spacer, and a slotted port situated in the side of said spacer such that said chamber is in airflow communication with the inner opening of said spacer and, hence, with the engine crankcase. The principal purpose of the actuator plate is to enable the crankcase pressure pulsations to be communicated to the external air pump by means of a hose or other operative connection without the need to drill holes or install fittings in, or otherwise modify or disassemble, the engine crankcase or block.

11 Claims, 3 Drawing Sheets

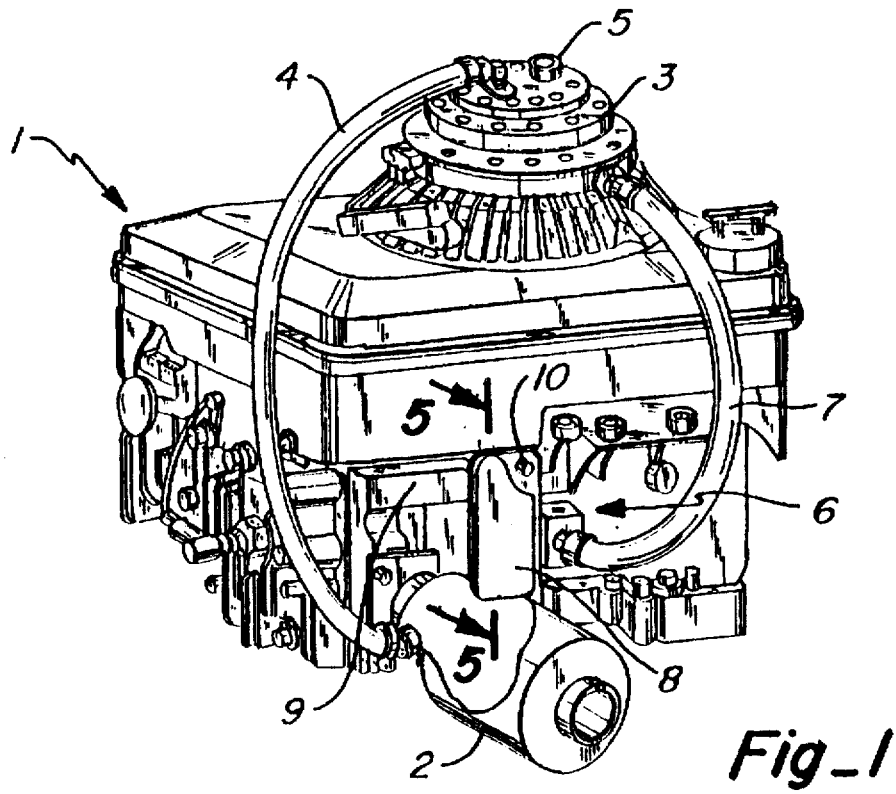
Fig_1
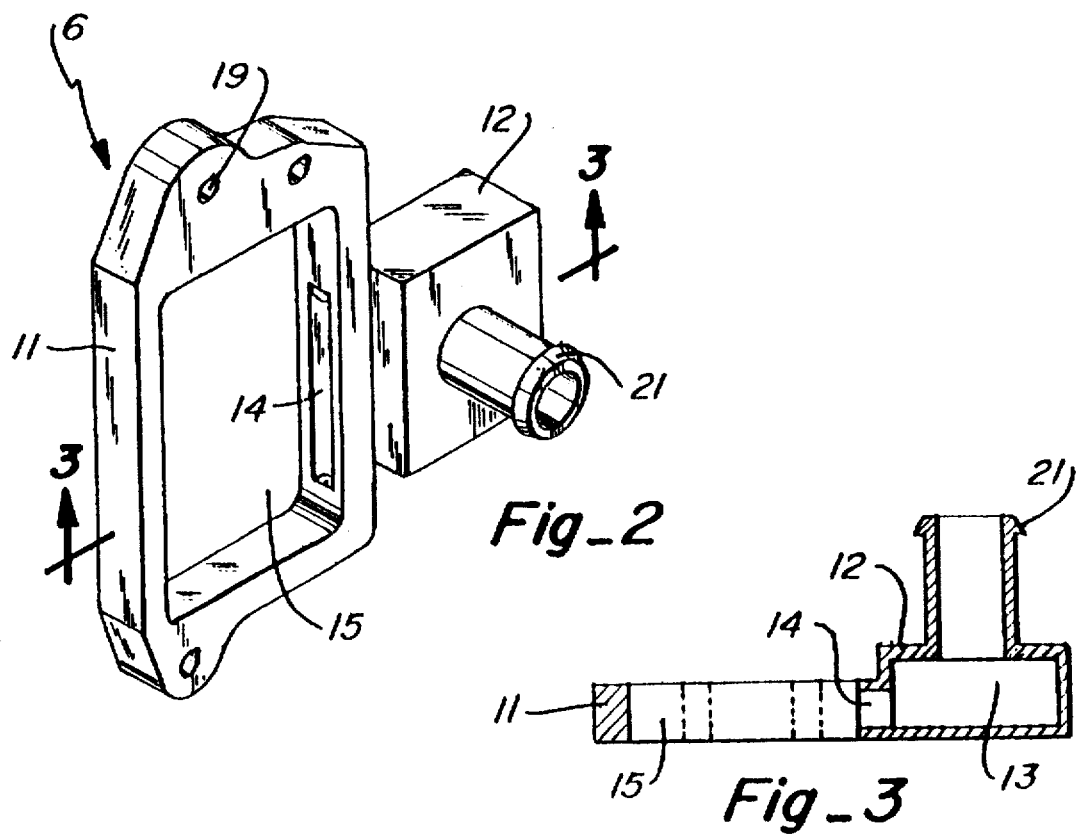
Fig_2
Fig_3

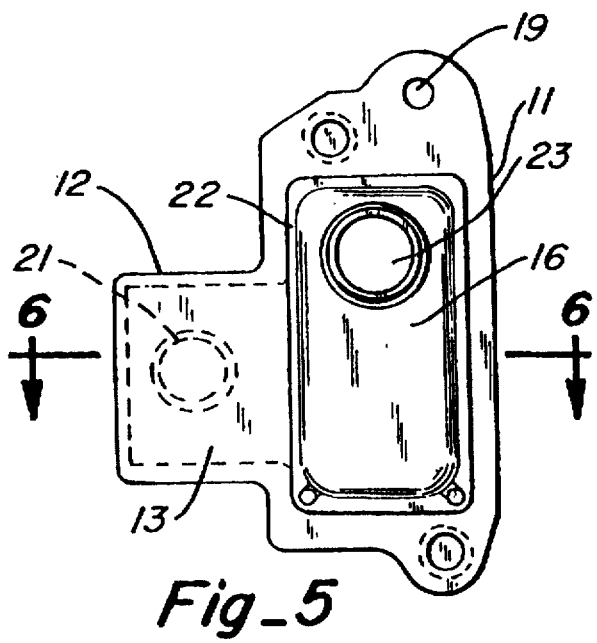
Fig_5
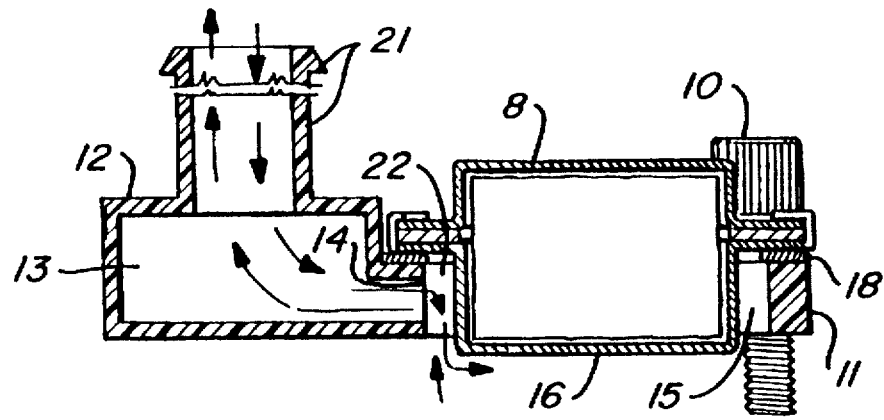
Fig_6

SECONDARY AIR SUPPLY SYSTEM FOR INTERNAL COMBUSTION ENGINES

BACKGROUND OF THE INVENTION

The present invention is a secondary air supply system for an internal combustion engine, particularly a single-cylinder engine.

In a given single-cylinder engine, a piston reciprocates in a cylinder, and the exhaust gas resulting from the combustion process is exhausted into an exhaust system containing a catalytic converter. The purpose of the catalytic converter is to promote an oxidation reaction whereby, among other things, (i) unburned hydrocarbons are converted to water and carbon dioxide, and (ii) carbon monoxide is converted to carbon dioxide. This oxidation reaction requires the presence of excess oxygen in the exhaust gas. The excess oxygen is furnished by supplying air into the exhaust system upstream from the catalytic converter. Such air is referred to as secondary air, in contrast to the air taken in by the engine and mixed with fuel, which is referred to as primary air.

Four-cycle engines having a closed crankcase produce crankcase gases during operation. Such crankcase gases principally result from combustion gases escaping past piston rings, and from the vaporization of moisture and fuel which enter the crankcase. Unless such gases are vented, increasing pressure in the crankcase will cause oil seals and gaskets to leak, and will force lubricating oil in the crankcase to leak past piston rings and into the combustion chamber. In addition, failure to vent such gases will result in premature engine oil contamination and consequent accelerated wear on internal engine parts. Thus, four-cycle engines require a crankcase breather mechanism to allow venting of such crankcase gases. Virtually all four-cycle engines for which the present invention is intended incorporate some form of crankcase breather mechanism.

In a two-cycle engine, a reed valve assembly is usually employed to control the flow of air and fuel mixture into the closed crankcase of the engine. Such reed valve assembly is attached to the intake port of the engine block or case.

Secondary air is generally introduced into the exhaust system of an internal combustion engine in one of the following three ways:

(i) A siphon arrangement employing a one-way valve, whereby negative pressure pulses in the exhaust gas flow draw in air under ambient atmospheric pressure. In other words, the flowing exhaust gas sucks in the secondary air through a one-way valve fitted to the exhaust system for that purpose.

(ii) A pump mechanically driven by the engine pumps the secondary air into the exhaust system.

(iii) A diaphragm pump, operated by pressure pulsations in the engine crankcase, pumps the secondary air into the exhaust system.

The first type of secondary air supply system mentioned above (the one-way siphon valve) is easy and inexpensive to construct, but has a major drawback in that the amount of secondary air introduced decreases as the amount of exhaust gas flow increases. The result is that at operating conditions other than light engine throttle, there will be insufficient secondary air to permit the catalytic converter to reduce undesirable engine emissions. Examples of such air siphon methodology are disclosed in U.S. Pat. Nos. 5,338,903 and 5,339,629.

The second type of secondary air supply system mentioned above (the engine-driven pump) is capable of supplying air in proportion to the amount of engine exhaust gas. Such a system, however, has several major drawbacks. It is expensive relative to other available methods of secondary air supply, and it will result in a net power loss of the engine. In addition, such a system would require major design changes to the engine and the vehicle or equipment of which the engine is a part. These are especially critical issues for small single-cylinder utility engines, which tend to be low-powered and inexpensive, and for which design changes to either the engine or the incorporating equipment could be prohibitively expensive.

The diaphragm air pump (the third system mentioned above) solves the problems associated with the siphon arrangement and the engine-driven air pump. Such a diaphragm pump is disclosed in U.S. Pat. No. 5,197,282. A major drawback of the secondary air supply system disclosed in such patent, however, is that it requires a fitting to be installed in the engine case of an engine unit in order to communicate the crankcase pressure pulsations to the diaphragm air pump. Fitting such a secondary air supply system during the manufacturing of a utility engine would necessitate a design change to the engine case or an extra manufacturing step. With respect to an in-service engine, installing such a system would necessitate disassembly of the engine case in order to remove metal shavings and prevent damage to internal engine parts. Such extensive disassembly would drastically inhibit the widespread adaptation of such a secondary air supply system to in-service utility engines.

SUMMARY OF THE INVENTION

An objective of the present invention is to promote the widespread use of catalytic converter technology to reduce emissions from small utility engines by means of fitting such engines with a simple and inexpensive secondary air supply system which does not require engine modifications or disassembly or equipment design changes. The present invention eliminates the defects and drawbacks of the prior art by providing a secondary air supply system which allows for easy adaptation of available secondary air pumps and which:

(i) introduces air into the exhaust system upstream from a catalytic converter in proportion to engine speed and the volume of exhaust gas from the engine;

(ii) does not induce a net power loss on the engine;

(iii) is simple and inexpensive to produce, and can be easily fitted to a wide variety of single-cylinder engines with little or no disassembly of or modification to the engine or to the vehicle or equipment incorporating the engine; and, (iv) allows for the venting of crankcase gases by means of the crankcase breather system currently fitted to a four-cycle engine.

The present invention is intended to be used with an engine having a closed crankcase capable of experiencing pressure pulsations produced by the reciprocating motion of a piston in a cylinder. When the piston in the engine is displaced toward the head of the engine (i.e., on the compression cycle or on the exhaust cycle), the engine crankcase experiences a negative pressure or vacuum (relative to atmospheric pressure). When the piston is displaced toward the engine crankcase (i.e., on the intake cycle or on the power cycle), the engine crankcase experiences a positive pressure (relative to atmospheric pressure).

The present invention consists of an air pump actuated by the crankcase pressure pulsations and an air pump actuator plate. The air pump can be a diaphragm pump such as disclosed in U.S. Pat. No. 5,197,282. Such a diaphragm pump consists of a diaphragm or actuating chamber operatively connected to the actuator plate described below. The diaphragm chamber of the pump is separated from the pumping chamber of the pump by a flexible diaphragm or membrane designed to oscillate in phase with the rotational speed of the engine. The pumping chamber of the diaphragm pump communicates with both an air inlet port and an air outlet port. Air drawn into the pumping chamber through the inlet port is filtered either through a separate filter operatively connected to said inlet port or, as disclosed in U.S. Pat. No. 5,197,282, by operatively connecting said inlet port to the engine's primary air filter. The outlet port is operatively connected to the exhaust system between the engine's exhaust port and a catalytic converter of known origin. Both the inlet valve and the outlet valve are one-way valves and are oriented in the pumping chamber such that air may move in only one direction through the pumping chamber. Secondary air is drawn into the pumping chamber through the inlet port and inlet valve when the diaphragm is displaced so as to increase the volume of the pumping chamber. The secondary air in the pumping chamber is then discharged through the outlet valve and outlet port when the diaphragm is displaced so as to decrease the volume of the pumping chamber.

The actuator plate of the present invention allows the crankcase pressure pulsations produced by the reciprocating motion of the engine's piston to be communicated to the external secondary air pump without drilling a hole or installing a hose fitting in the case or block of an engine. For example, the vast majority of small four-cycle utility engines have a chamber cast into the engine block for attaching a crankcase breather assembly in order to vent crankcase gases. Said chamber also provides the ideal means of accessing the pressure pulsations produced in the crankcase. The actuator plate fits between the engine block and the engine's current breather assembly, using the same means of attachment as the breather assembly and thus requiring no modification to the engine. The actuator plate allows the pressure pulsations in the crankcase to be communicated to the air pump by means of a hose or other operative connection. The engine's current crankcase breather system remains fully functional. In a two-cycle engine employing a reed plate attached to the inlet port of the engine block, the actuator plate fits between the engine block and the reed plate, using the same means of attachment as the reed plate. No modifications to the two-cycle engine block are required.

The actuator plate may be made from any material capable of withstanding an environment of elevated temperatures in the range of 200° F. to 350° F., vibration and exposure to engine oil and gasoline, and which may be machined, cast, molded or pressure or vacuum formed. Materials may include, without limitation, metals, plastics, composites, synthetic resins, ceramics, fiberglass or other suitable materials.

The engine crankcase experiences one positive pressure pulse and one negative pressure pulse for each revolution of the engine crankshaft. Thus, an air pump actuated by such pressure pulsations, such as the diaphragm pump described above, would supply secondary air to the engine exhaust system in direct proportion to engine rotational speed. A preferred embodiment would place the external air pump at a higher elevation on the engine unit than the actuator plate. Such an orientation will enable any engine oil which may be discharged from the actuator plate into the hose or tube connecting to the air pump to continuously drain back under gravitational force to the engine crankcase.

BRIEF DESCRIPTION OF THE DRAWINGS

The drawings illustrate a preferred embodiment of the present invention. Referring to the drawings:

FIG. 1 is a schematic view of a four-cycle single-cylinder utility engine unit to which a secondary air supply system according to the present invention is applied;

FIG. 2 is a three-dimensional view of one embodiment of the actuator plate incorporated in the secondary air supply system shown in FIG. 1;

FIG. 3 is a sectional view of the actuator plate along the plane of line 3—3 in FIG. 2;

FIG. 5 is a backside view of the actuator plate and crankcase breather assembly from the plane of line 5—5 in FIG. 1; and FIG. 6 is a sectional view of the actuator plate and crankcase breather assembly along the plane of line 6—6 in FIG. 5.

DESCRIPTION OF THE PREFERRED EMBODIMENT

Figure 4:
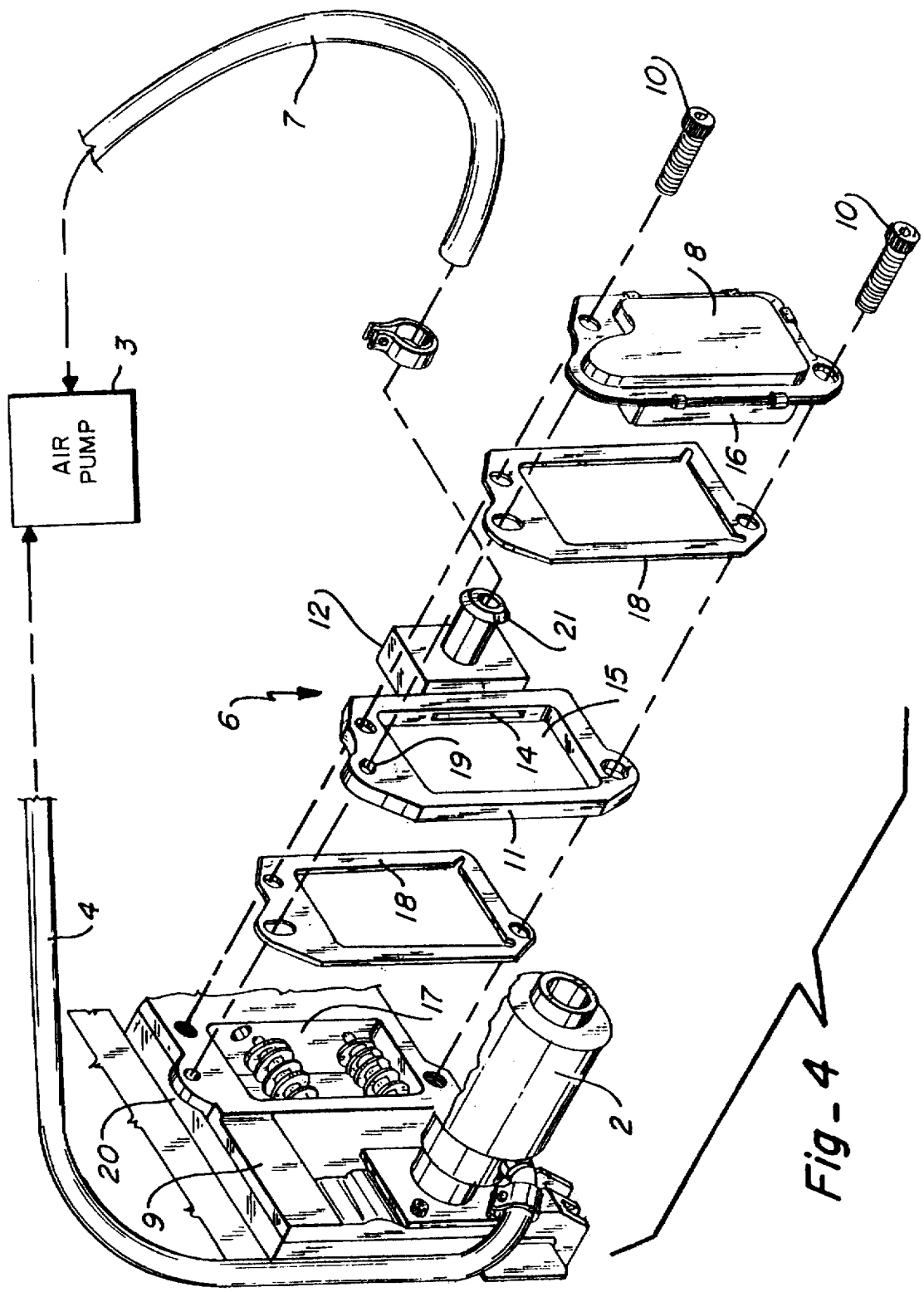
FIG. 4 is an exploded view showing how the actuator plate depicted in FIG. 2 is installed between the crankcase breather assembly and the engine block, and also schematically showing the connection between the actuator plate and the air pump, and the connection between the air pump and the exhaust system.

Referring to FIG. 1, a given four-cycle single-cylinder engine unit 1 has an exhaust system connected to its exhaust port, not shown. The exhaust system is comprised of a combined catalytic converter/muffler unit 2 of known origin. Exhaust gas produced by the combustion process in the engine unit is expelled through the exhaust port and into the exhaust system. The exhaust gas then undergoes a secondary oxidation process in the catalytic converter, and after being silenced by the muffler portion of the exhaust system, is discharged into the atmosphere.

The secondary oxidation process which the exhaust gas undergoes in the catalytic converter requires the presence of excess oxygen in the exhaust gas. The required excess oxygen is provided by injecting so-called secondary air into the exhaust system between the exhaust port and the catalytic converter/muffler unit 2. The secondary air is pumped into the exhaust system by the air pump 3. The outlet port, not shown, of the air pump 3 is connected to the exhaust system by means of a hose 4 or other suitable operative connection and fittings of known configuration.

The inlet port, not shown, of the air pump 3 is fitted with a small air cleaner 5 to provide greater flexibility in the mounting location of the pump. Alternatively, the inlet port of the pump may be connected by means of a hose or other operative connection to the engine's primary air cleaner, not shown, such that air drawn into the pump would be filtered by said primary air cleaner instead of a separate air cleaner 5 fitted directly to the inlet port.

The air pump 3 is further connected to the actuator plate 6 by means of a hose 7 or other suitable operative connection and fittings of known configuration. The actuator plate 6 is fitted to the engine between the engine's current breather assembly 8 and the engine block 9, employing the same means of attachment as the breather assembly 8. For example, the same bolts 10 that attach the breather assembly 8 to the engine block 9 will also attach the actuator plate 6.

It is preferable that the air pump 3 be mounted in a higher plane of elevation than the actuator plate 6, and that the air pump 3 and its fitting for connection to the actuator plate 6 be oriented in such a way that engine oil discharged into the connective means 7 between the actuator plate 6 and the air pump 3 may continuously drain back to the engine crankcase, not shown, under gravitational force.

The actuator plate 6 consists of a spacer 11 and a housing 12 defining a chamber 13 located on one side of the spacer 11. The actuator plate 6 may be made from a suitable material such as a temperature-resistant plastic or a synthetic resin. A slotted opening or port 14 in the side of the spacer 11 allows said chamber 13 to communicate with the engine crankcase. As previously noted, the actuator plate 6 attaches to the engine block 9 in the same location as the engine's current breather assembly 8, requiring no other disassembly of or modification to the engine. The inner opening 15 of the spacer 11, into which the inner housing 16 of the breather assembly 8 fits, is larger than the breather assembly inner housing 16 but no larger than the engine block opening 17 into which the breather assembly inner housing 16 originally fit. Thus, a gap 22 is provided between the breather assembly inner housing 16 and the surface of the inner opening 15 of the spacer 11. Said gap 22 allows the crankcase pressure pulsations to be communicated to the slotted port 14 in the side of the spacer 11 and, in turn, to the actuator plate chamber 13. The actuator plate chamber 13 is intended to communicate with the air pump 3 by means of a hose 7 or other suitable operative connection. Said hose 7 or other connection may be connected to the actuator plate chamber 13 by means of a separate fitting of known configuration or by a fitting formed integrally 21 with the actuator plate 6. The hole 19 shown in FIG. 2 (a backside view of which is shown in FIG. 5) aligns with the crankcase breather vent hole, not shown, and a corresponding tube 20 to transmit vented crankcase gases to the engine's primary air intake. Reference number 18 denotes gaskets. Reference number 23 denotes a disc valve opening in the crankcase breather assembly inner housing 16 for controlling the flow of vented crankcase gases.

When the piston, not shown, in the engine 1 is displaced away from the crankcase, not shown, the effective volume of the crankcase is suddenly increased and the air in the crankcase experiences negative pressure relative to atmospheric pressure. When the piston is displaced toward the crankcase, the effective volume of the crankcase is suddenly decreased and the air in the crankcase experiences positive pressure relative to atmospheric pressure. Thus, the crankcase experiences one positive pressure pulse and one negative pressures pulse for each crankshaft revolution. The crankcase pressure pulsations are communicated (as indicated by the airflow communication arrows shown in FIG. 6) from the actuator plate chamber 13 to the air pump 3 by connective means 7 as previously described. Secondary air is injected by the air pump 3 into the catalytic converter/muffler unit 2 in direct proportion to the rotational speed of the engine and the amount of exhaust gas produced. In addition, the actuator plate 6 enables a secondary air supply system as described herein to be fitted to a four-cycle engine unit with no modification or disassembly of the engine (other than removal and reinstallation of the crankcase breather assembly 8), while leaving the engine's crankcase breather system fully functional.

While the foregoing preferred embodiment was described principally with reference to a four-cycle engine, the actuator plate may also be applied to a two-cycle engine, not shown. As previously described, the actuator plate would fit between the intake port of the engine block and the intake reed plate. The inner opening of the actuator plate would have the same dimensions as the inside dimensions of said intake port. The actuator plate would have the same bolt pattern as the reed plate, so that the fasteners which attach the reed plate to the engine block would also attach the actuator plate.

I claim the following:

1. In a four-cycle internal combustion engine having a crankcase capable of experiencing pressure pulsations resulting from the reciprocating motion of the engine's piston in a cylinder, and further having provisions for attaching a crankcase breather mechanism to the engine block for venting crankcase gases produced during the operation of the engine, an apparatus, hereinafter referred to collectively as an "actuator plate," providing a means to communicate said pressure pulsations to an external air pump, said actuator plate comprising:

(a) a spacer with a means of attachment to the engine block.

(b) said spacer fitting between the engine's crankcase breather assembly and the engine block and having an inner opening large enough to provide a clearance between the surface of the inner opening of said spacer and the inner housing of said breather assembly.

(c) a housing located on one side of the spacer and defining a chamber, said chamber to be in communication with a connective means for transmitting crankcase pressure pulses to an external air pump, and (d) a port in the surface of the spacer inner opening, with a passage from said port to the chamber, enabling the crankcase pressure pulses to be communicated to the chamber.

2. An actuator plate according to claim 1, wherein the spacer has an inner opening approximately equal in dimensions to the engine block opening into which the engine's crankcase breather assembly originally fit.

3. An actuator plate according to claim 1, wherein the spacer has approximately the same peripheral dimensions and the same means of attachment to the engine block as the engine's crankcase breather assembly.

4. An actuator plate according to claim 1, wherein the chamber housing is integrally formed with and on one side of the spacer.

5. An actuator plate according to claim 1, wherein the chamber housing is a separate piece and attached to one side of the spacer.

6. An actuator plate according to claim 1, with an opening through the spacer positioned so as to align with the vent hole of the engine's crankcase breather assembly, and enabling said vent hole to be in airflow communication with a vent tube fitted to the engine for the purpose of transmitting vented crankcase gases to the primary air cleaner or primary air intake.

7. In a two-cycle internal combustion engine having a crankcase capable of experiencing pressure pulsations resulting from the reciprocating motion of the engine's piston in a cylinder, and further having a reed valve assembly to control the flow of air and fuel mixture into the engine crankcase, an actuator plate comprising;

(a) a spacer with a means of attachment to the engine block, (b) said spacer fitting between the engine's reed valve assembly and the intake port of the engine block and having an inner opening large enough to provide a clearance between the surface of the inner opening of said spacer and the portion of the reed valve assembly extending into the intake port, (c) a housing located on one side of the spacer and defining a chamber, said chamber to be in communication with a connective means for transmitting crankcase pressure pulses to an external air pump, and (d) a port in the surface of the spacer inner opening, with a passage from said port to the chamber, enabling the crankcase pressure pulses to be communicated to the chamber.

8. An actuator plate according to claim 7, wherein the spacer has an inner opening approximately equal in dimensions to the intake port opening in the engine block.

9. An actuator plate according to claim 7, wherein the spacer has approximately the same peripheral dimensions and the same means of attachment to the engine block as the engine's intake reed valve assembly.

10. An actuator plate according to claim 7, wherein the chamber housing is integrally formed with the spacer.

11. An actuator plate according to claim 7, wherein the chamber housing is a separate piece and attached to one side of the spacer.

* * * * *